(12) United States Patent
Miklo et al.

(10) Patent No.: US 7,731,153 B2
(45) Date of Patent: Jun. 8, 2010

(54) HANDLE FOR VALVES

(75) Inventors: Jürgen Miklo, Thayngen (CH); Peter Tkaczyk, Elchingen (DE)

(73) Assignee: Georg Fischer Rohrleitungssysteme AG, Schaffhausen (CH)

( * ) Notice: Subject to any disclaimer, the term of this patent is extended or adjusted under 35 U.S.C. 154(b) by 762 days.

(21) Appl. No.: 11/523,421

(22) Filed: Sep. 18, 2006

(65) Prior Publication Data

US 2007/0063157 A1    Mar. 22, 2007

(30) Foreign Application Priority Data

Sep. 20, 2005   (EP) .................................. 05020447

(51) Int. Cl.
*F16K 35/02*   (2006.01)
(52) U.S. Cl. .................. 251/99; 251/109; 251/288; 251/290; 251/292; 137/385
(58) Field of Classification Search .................. 251/92, 251/93, 101, 105, 108, 111, 115, 287, 288, 251/290, 291, 292, 99, 109; 137/384.8, 385, 137/553, 554, 556.3, 270; 70/207
See application file for complete search history.

(56) References Cited

U.S. PATENT DOCUMENTS

| | | | | | |
|---|---|---|---|---|---|
| 2,626,334 | A | * | 1/1953 | Koenig | ........................ 200/569 |
| 4,304,256 | A | * | 12/1981 | Taiani | ...................... 137/556.3 |
| 4,872,482 | A | * | 10/1989 | Jarrett | ......................... 137/554 |
| 5,595,217 | A | * | 1/1997 | Gillen et al. | ........... 137/614.06 |
| 5,598,724 | A | * | 2/1997 | Primeau | ....................... 70/177 |
| 5,697,397 | A | * | 12/1997 | Mellem et al. | ......... 137/315.35 |
| 2005/0161624 | A1 | * | 7/2005 | Bancroft et al. | ............. 251/109 |

FOREIGN PATENT DOCUMENTS

| | | |
|---|---|---|
| AT | 75 40 569 | 5/1976 |
| DE | 41 33 548 | 4/1993 |
| EP | 0 702 177 | 3/1996 |
| WO | WO 90/01650 | 2/1990 |

* cited by examiner

*Primary Examiner*—Stephen Hepperle
*Assistant Examiner*—Jeremy S Baskin
(74) *Attorney, Agent, or Firm*—Bachman & LaPointe, P.C.

(57) ABSTRACT

A handle (1) for valves (4) comprising a connecting region (2) for connecting the handle (1) to a spindle (5) of the valve (4), an actuating arm (3) for actuating the valve (4), a locking lever (8) arranged resiliently in the actuating arm (3) for engaging the actuating arm (3) and a locking and guide disc (16) for locking and guiding the handle (1), the locking and guide disc (16) having a greater external diameter than the connecting region (2) and being arranged to be able to be connected to a flange region (12) of the valve (4).

9 Claims, 3 Drawing Sheets

HANDLE FOR VALVES

BACKGROUND OF THE INVENTION

The invention relates to a handle for valves comprising a connecting region for connecting the handle to a spindle of the valve, an actuating arm for actuating the valve, a locking lever arranged resiliently in the actuating arm for engaging the actuating arm and a locking and guide disc for locking and guiding the handle.

Depending on the nature of the task, valves of different design, for example ball valves or flap valves, are used in pipeline systems. Depending on the nature of the task and the design of the control system, valves are used which are held in different valve positions, or, in the absence of a control system are manually turned on or off. The ability to reproduce precisely the adjustment of the valve may be crucial for the process control system.

A generic handle for valves is known from DE 10317808 A1. The handle is placed with a cylindrical neck region over the valve spindle and guided by a guide ring during rotary motion. The guide ring is arranged inside the cylindrical neck region. An actuation lock is resiliently arranged in the arm of the handle. The actuation lock cooperates with a latch part which may be lifted in the axial direction from a locking position into an actuating position. The handle is secured by a sealing plate against unauthorized actuation.

Proceeding from this prior art, it is the object of the invention to provide a handle for valves which is constructed from as few parts as possible and which may be adapted to different designs of valve.

SUMMARY OF THE INVENTION

This object is achieved by a handle for valves comprising a connecting region for connecting the handle to a spindle of the valve, an actuating arm for actuating the valve, a locking lever arranged resiliently in the actuating arm for engaging the actuating arm and a locking and guide disc for locking and guiding the handle, the locking and guide disc having a greater external diameter than the connecting region and being arranged below the connecting region and to be able to be connected to a flange region of the valve.

It is advantageous for the handle to be able to be actuated both continuously and freely selectively, as well as intermittently and in discrete steps. This is achieved by the locking and guide disc being configured with different guide and locking means on two opposing sides. The locking and guide disc may be fitted between the handle and the flange region of the valve with four different orientations.

It is also advantageous for the total overall height of the valve to be kept as low as possible, by means of the handle. This is achieved by the switching ring and the locking and guide disc being configured as flat as possible and being arranged to engage partially in one another.

BRIEF DESCRIPTION OF THE DRAWINGS

An embodiment of the invention is described with reference to the figures, in which.

DETAILED DESCRIPTION

Figure 1:
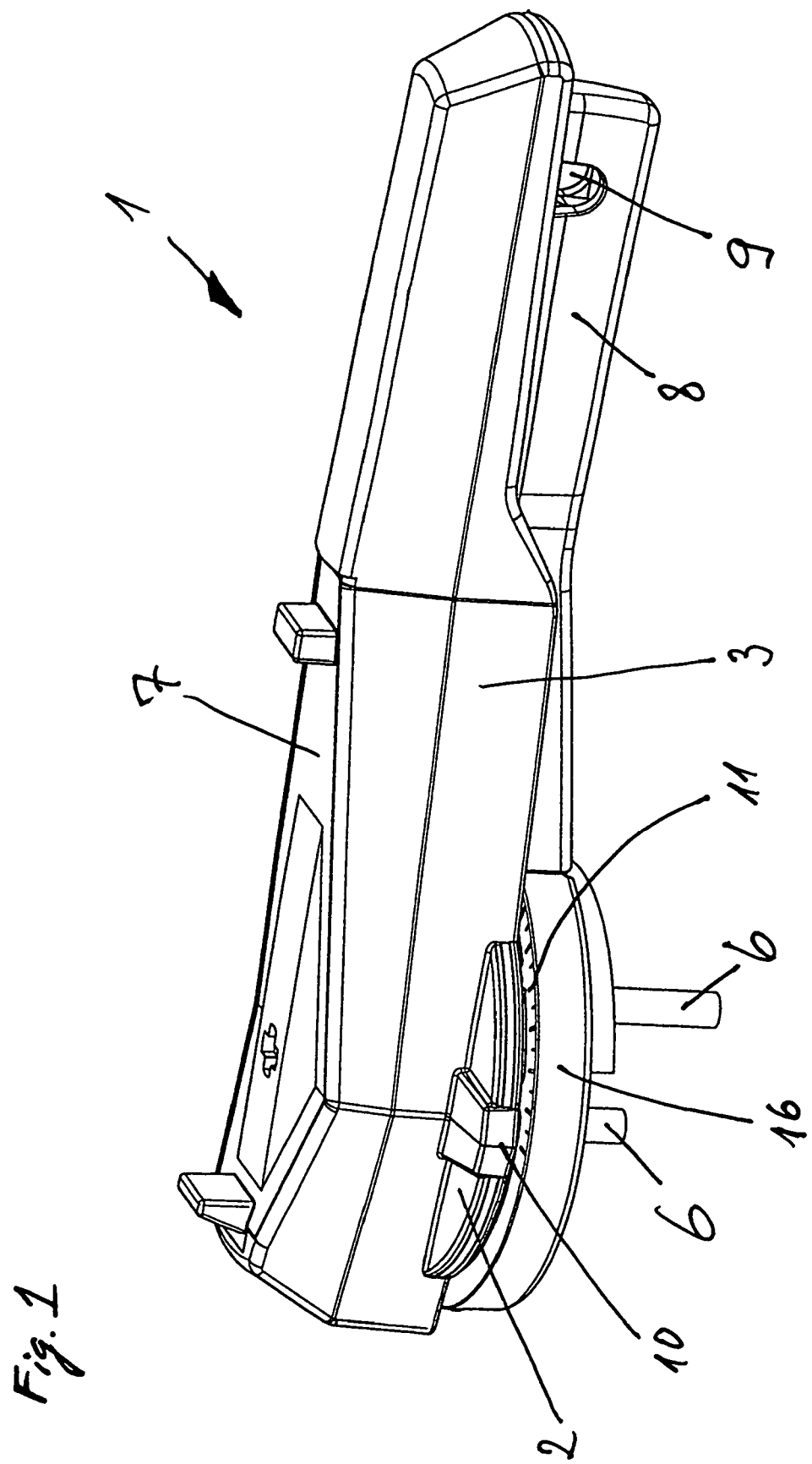
FIG. 1 is a perspective view of a handle for valves according to the invention.

A handle 1 for actuating valves is shown in perspective in FIG. 1. The handle 1 substantially consists of a connecting region 2 and an actuating arm 3. The connecting region 2 is configured in a substantially circular manner around the axis of rotation of the valve and forms the lower region of the actuating arm 3. The handle 1 corresponds to the valve 4 which is shown in partial perspective in FIG. 2. The connecting region 2 comprises a receiver on the lower face which is configured to correspond to the spindle 5 of the valve 4. By means of the receiver, the handle 1 is positioned or screwed onto the spindle 5 of the valve 4 and thus forms a positive connection. As an alternative, the receiver may also be configured on the spindle 5. In this case, a projection which corresponds to said receiver is configured on the lower face of the connecting region 2. The connecting region 2 also comprises two axially and downwardly oriented fingers 6 which engage in part-circular grooves on the housing of the valve 4. On the upper face, the connecting region 2 is closed by a sealing plate 7. The sealing plate 7 is produced from a material which is mechanically more rigid than the remainder of the handle 1 and may therefore also be used as a tool when fitting and removing a ball valve.

A locking lever 8 is visible in the actuating arm 3. The locking lever 8 is arranged to be movable inside the actuating arm. The locking lever 8 serves to release the actuation mechanism of the handle 1 and may be lifted against a spring force in the axial direction. The locking lever 8 comprises a through-passage 9, through which a lock shackle may be introduced. When the lock shackle is hooked-in and locked, the handle 1, and thus the valve 4, may be secured against unauthorized actuation. The connecting region 2 of the handle 1 also comprises, at least to the left or to the right of the actuating arm 3, an indicating arrow 10 which indicates on a scale 11 on a locking and guide disc 16 the position of the handle 1 and, therefore, also that of the spindle 5 of the valve 4.

Figure 2:
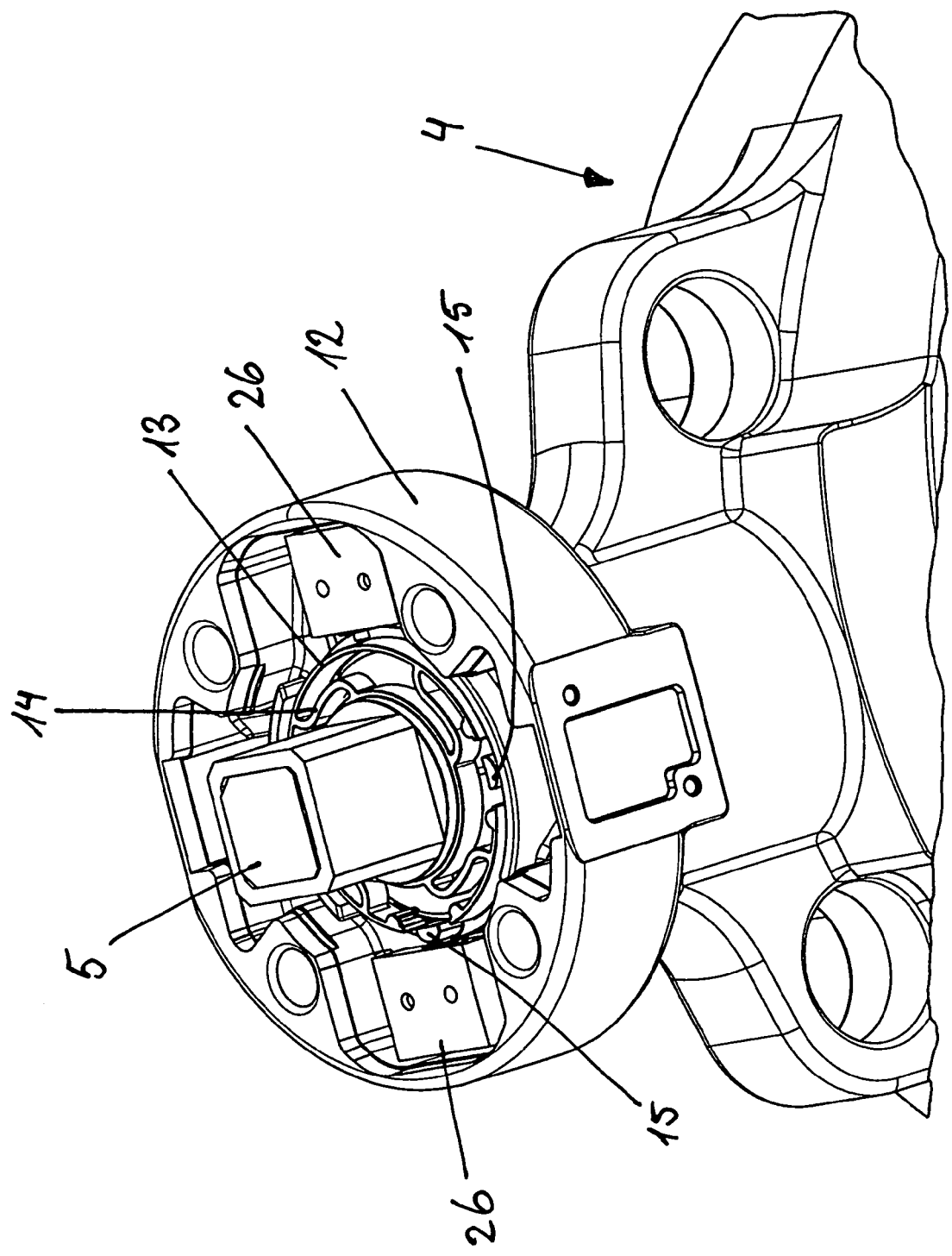
FIG. 2 is a perspective partial view of a valve for actuation by the handle of FIG. 1.

A flange region 12 of the housing of a valve 4 is shown in perspective in FIG. 2. The valve 4 in FIG. 2 is configured as a butterfly valve but may, for example, also be configured as a ball valve. The spindle 5 projects upwardly in the flange region 12 to receive the connecting region 2. In the flange region 12 a switching ring 13 is arranged in one plane all around the spindle 5. The switching ring 13 has an internal diameter which exactly corresponds to the external diameter of the spindle 5 and follows the rotary motions of the spindle 5.

The switching ring 13 comprises resilient S-shaped regions 14 in the radial direction and cam lobes 15 oriented radially outwardly. The switching ring 13 is mounted in the flange region 12 of the valve 4 by means of the resilient S-shaped regions 14 and is guided securely and with consistent accuracy even in the event of vibration, deformation or expansion as a result of temperature or pressure differences of the valve 4. The cam lobes 15 serve to actuate electrical or mechanical switches 26. In this manner, it is achieved that a confirmation of the valve position may be conveyed to a display panel or to a measuring, control and regulating unit. The radial alignment of the cam lobes 15 allows the flange region 12 to be of very flat construction. By means of the arrangement in one plane, even pressure springs or retaining clips are no longer required for securing the contact between the cam lobes 15 and the switches 26. The height of the switching ring 13 is substantially lower than the height of the locking and guide disc 16. In this manner, it is achieved that the switching ring 13 may be arranged inside the locking and guide disc 16 and the overall height may be reduced as a whole.

Figure 3:
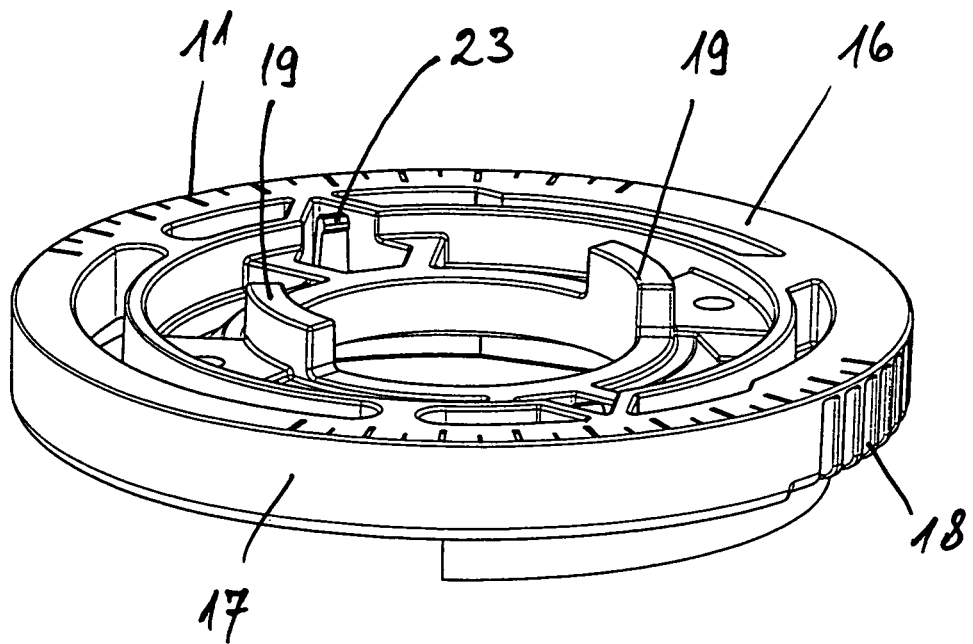
FIG. 3 is a perspective view of a locking and guide disc for the handle of FIG. 1
Figure 4:
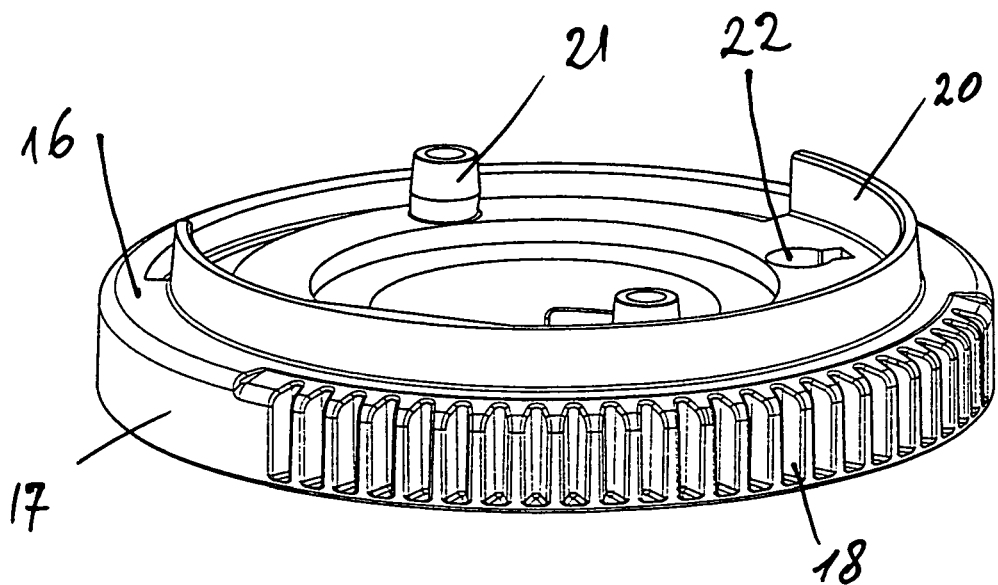
FIG. 4 is a further perspective view of the locking and guide disc of FIG. 1.

A locking and guide disc 16 is shown in perspective in FIG. 3 and FIG. 4. The locking and guide disc 16 is arranged below the connecting region 2 of the handle 1 and above the flange region 12 of the valve 4. The locking and guide disc 16 is shown in FIGS. 3 and 4, viewed from two opposing sides. The locking and guide disc 16 has different locking and guide means on both sides and may therefore be used for different purposes. In FIG. 3 the locking and guide disc is shown with the scale 11 for indicating the position of the handle 1 facing upwards. On the outer edge 17 of the locking and guide disc 16 a region with notches 18 is configured, into which the locking lever 8 of the handle 1 may engage. In FIG. 3 the notches 18 are distributed over a circumferential angle of 90°. No notches 18 are configured on the outer edge 17 of the locking and guide disc 16 on the diametrically opposing side. For valves which require an opening angle of greater than 90°, the circumferential angle of the region with the notches 18 may be selected to be greater, up to approximately 180°.

The locking and guide disc 16 may be fitted in four different orientations, either by rotating about the disc axis by 180° or by reversing the disc 16 so that the upper face and lower face are exchanged. If the locking and guide disc 16 is fitted in the reverse direction, as is shown, for example, in FIG. 4, the locking lever 8 does not engage in the notches 18 and the valve 4 may be adjusted continuously, i.e. freely selectively in any position. This facility for adjustment is advantageous especially with flap valves.

Different guide means 19, 20 project on both sides of the disc 16 from the plane of the locking and guide disc 16. In this manner, it is achieved that the same handle 1 may be adapted to different designs of valves.

The guide means 19 are configured in FIG. 3 as two opposingly arranged lugs 19. In FIG. 4, the guide means 20 are configured as a continuous slide 20 which extends over a circumferential angle of more than 180°. By means of the lugs 19, the locking and guide disc 16 may be used in receivers corresponding thereto in the flange region 12 of the valve 4. With appropriate configuration, further functions may be controlled by means of the slide 20. For example, the rotary motion of the disc may be halted by means of the slide 20. Conically formed locating lugs 21 for the alignment of the disc 16 are visible in FIG. 4. According to the design of the valve 4, the locking and guide disc 16 may be screwed onto the flange region 12 of the valve. The screws are inserted into through-passages 22 and held by locking hooks 23 until the final fitting of the valve 4. The locking hooks 23 are configured on the edge of the through-passages 22 on the opposing side of the disc 16. By means of the locking and guide disc 16, the same handle 1 may be used both in connection with, for example, a flap valve and with a ball valve.

The invention claimed is:

1. Handle for valves comprising a connecting region for connecting the handle to a spindle of a valve, an actuating arm for actuating the valve, a locking lever arranged resiliently in the actuating arm for engaging the actuating arm and a locking and guide disc for locking and guiding the handle, wherein the locking and guide disc has a greater external diameter than the connecting region and is arranged to be able to be connected to a flange region of the valve, the locking and guide disc has a first side, a second side opposing the first side, and an outer circumferential surface, wherein at least one lug and one locking hook are provided on the first side and a slide and at least one locating lug is provided on the second side, wherein the locking and guide disc may be fitted to coincide with the design and the purpose of the valve in four different orientations.

2. Handle for valves according to claim 1, wherein notches are provided on the outer circumferential surface of the locking and guide disc.

3. Handle for valves according to claim 2, wherein the notches are formed on the outer circumferential surface of the locking and guide disc in a region with a circumferential angle of between about 90° to 180°.

4. Handle for valves according to claim 1, wherein the at least one lug is arranged to extend in an axial direction.

5. Handle for valves according to claim 4, wherein the slide is arranged to extend in the axial direction.

6. Handle for valves according to claim 5, wherein the slide is configured continuously over a circumferential angle of more than 180°.

7. Handle for valves according to claim 1, wherein a flange region of the valve is provided with a switching ring arranged to cooperate with the handle.

8. Handle for valves according to claim 7, wherein the switching ring comprises resilient S-shaped regions in the radial direction and cam lobes oriented radially outwardly.

9. Handle for valves according to claim 7, wherein that the switching ring has a height which is lower than a height of the locking and guide disc, the switching ring and the locking and guide disc being arranged to engage at least partially in one another.

* * * * *